(12) United States Patent
Dexel

(10) Patent No.: US 6,213,361 B1
(45) Date of Patent: Apr. 10, 2001

(54) LOCKING FOUR-WAY LUG WRENCH CARRIER

(76) Inventor: Dennis D. Dexel, 21415 Hwy. 140, Hesperus, CO (US) 81326

( * ) Notice: Subject to any disclaimer, the term of this patent is extended or adjusted under 35 U.S.C. 154(b) by 0 days.

(21) Appl. No.: 09/421,512

(22) Filed: Oct. 20, 1999

(51) Int. Cl.[7] .................................................. B60R 7/00
(52) U.S. Cl. .................... 224/42.24; 224/42.25; 224/42.26; 224/42.3; 70/259
(58) Field of Search ............................ 224/42.24, 42.25, 224/42.26, 42.3; 70/258, 259

(56) References Cited

U.S. PATENT DOCUMENTS

| | | | | |
|---|---|---|---|---|
| 2,711,274 | * | 6/1955 | Stephans | 224/42.24 |
| 2,831,622 | * | 3/1958 | Bacca | 224/42.24 |
| 3,613,972 | * | 10/1971 | Duaghhetee | 224/42.24 |
| 3,688,954 | * | 9/1972 | Neal | 224/42.24 |
| 3,843,033 | * | 10/1974 | Wirth, Sr. | 224/42.24 |
| 3,865,291 | * | 2/1975 | Tidwell | 224/42.24 |
| 4,007,863 | * | 2/1977 | Norris | 224/42.24 |
| 4,225,066 | * | 9/1980 | Barr | 224/42.24 |
| 4,294,088 | * | 10/1981 | Barr | 70/56 |
| 4,598,848 | * | 7/1986 | Clark | 224/42.24 |
| 4,751,833 | * | 6/1988 | Stumf, Jr. | 70/259 |
| 4,873,851 | * | 10/1989 | Arnett | 70/259 |
| 5,586,698 | * | 12/1996 | Satoh | 224/42.24 |

* cited by examiner

*Primary Examiner*—Stephen K. Cronin
(74) *Attorney, Agent, or Firm*—Albert O. Cota

(57) ABSTRACT

A four way lug wrench carrier attached to a motor vehicle or trailer which includes a hollow wrench carrier body (20) having an extended shackle lock pin (24) with the body connected to a round shaft (32). The shaft has an adjustable flanged sleeve (36) that connects directly to a spare wheel carrier (40) to accommodate various widths of spare tires. Securement means in the form of a flat washer (46) is held in place on the end of the shaft thus providing secondary protection for the carrier. A shackle-less padlock (64) is permanently mounted in a locking cover (60) that slips over the body and captivates a four way lug wrench (54) using open ended slots (22) and (62) in the body and cover. The wrench is locked in place on the outside of the wheel to prevent theft of both the tire/wheel and wrench. A second embodiment replaces the locking cover with a conventional lock having a U-shaped shackle (70) that is permanently installed in a round body (66) thereby eliminating the necessity of a cover while functioning in the same manner.

14 Claims, 4 Drawing Sheets

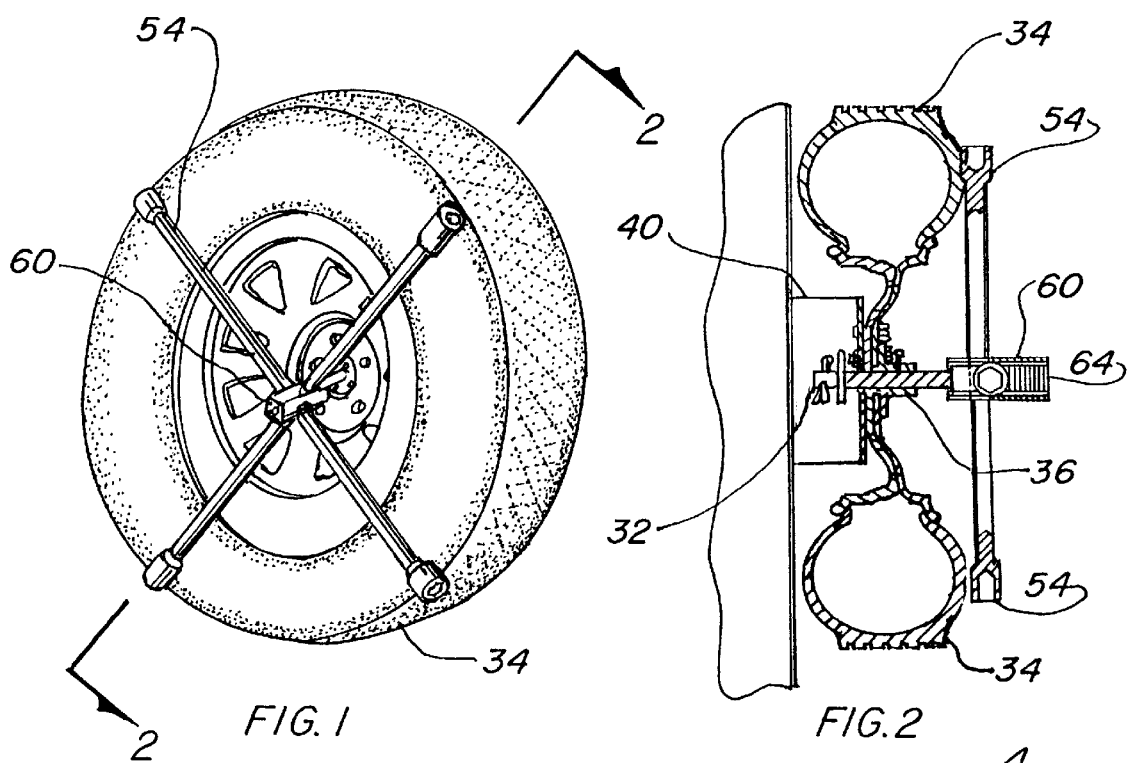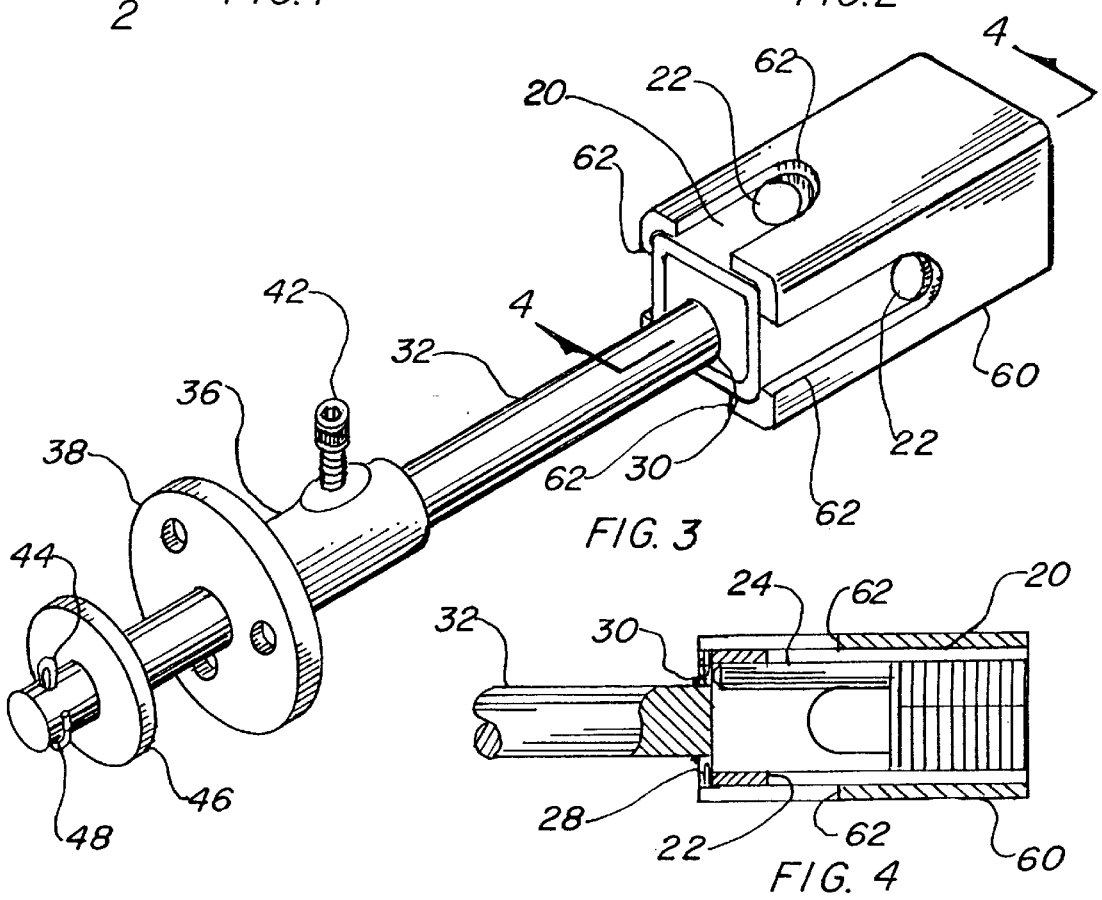

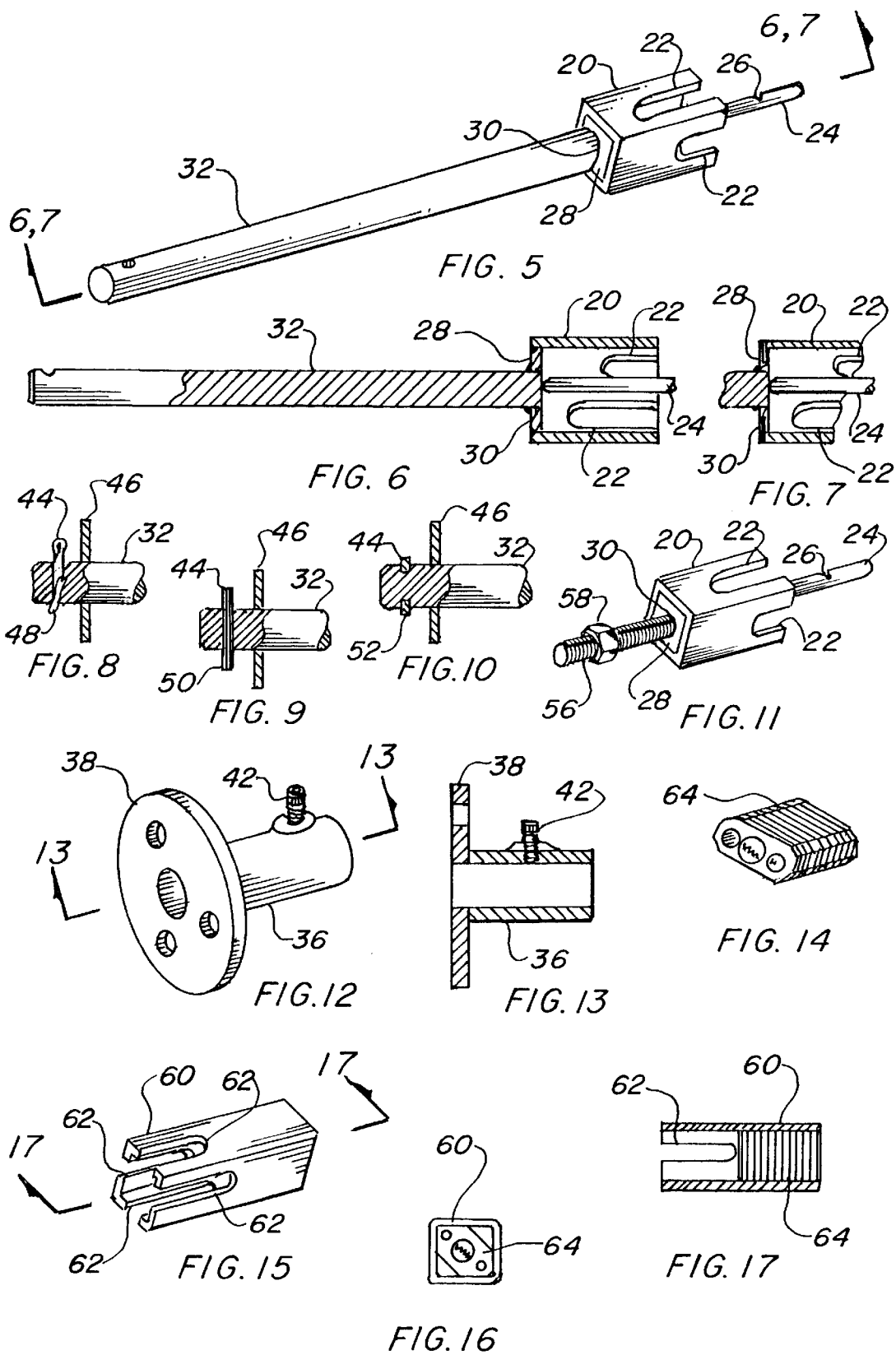

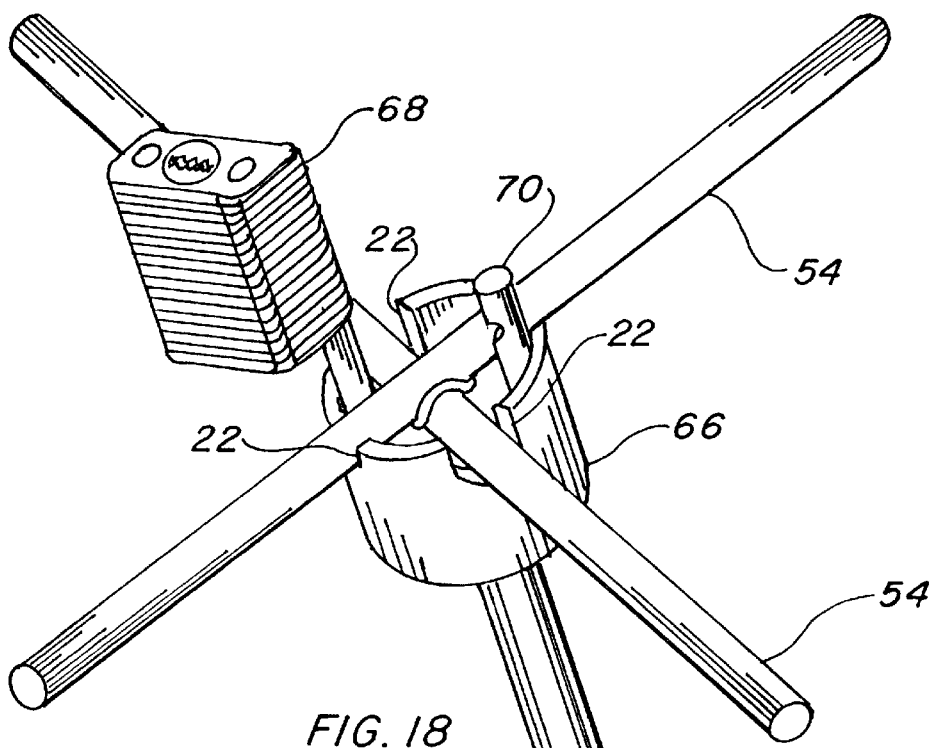
FIG. 18
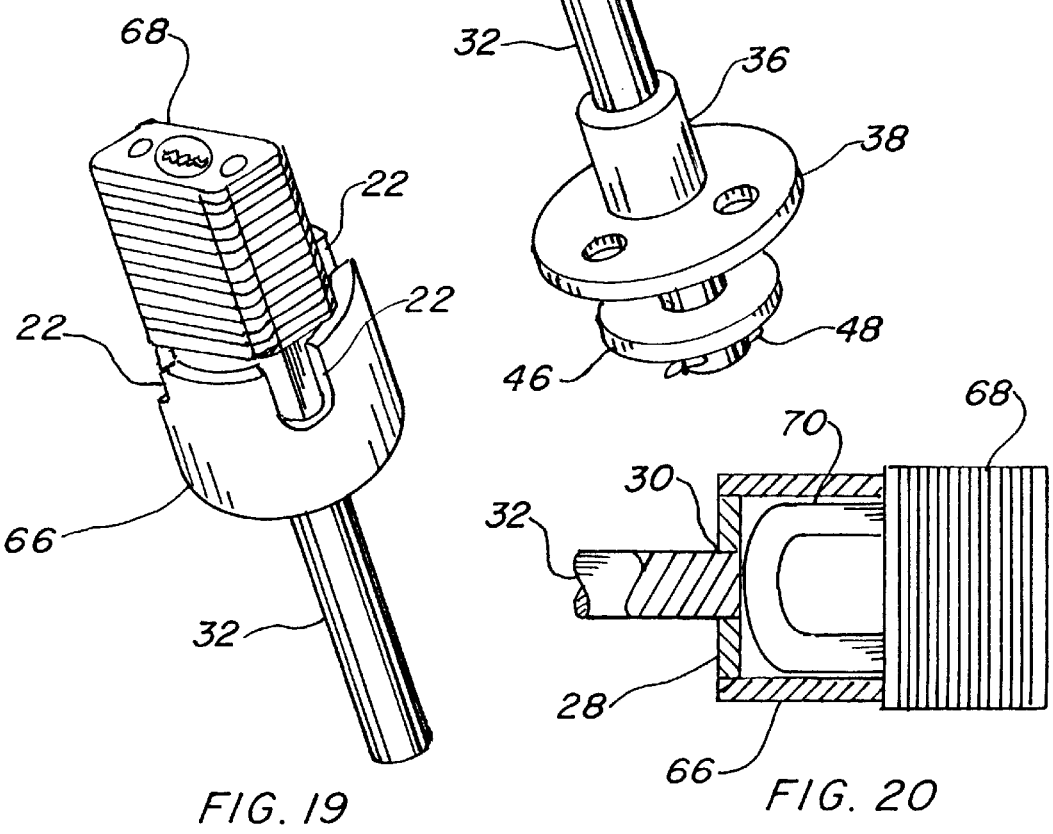
FIG. 19
FIG. 20

LOCKING FOUR-WAY LUG WRENCH CARRIER

TECHNICAL FIELD

The present invention relates to lug wrench carriers in general, and more specifically to a carrier that includes a four-way lug wrench which is locked in place over a spare tire to prevent theft of both the lug wrench and the spare tire.

BACKGROUND ART

Previously, many types of carriers have been used to provide an effective means of securing a spare tire to a vehicle or trailer. In the past, elaborate carriers have been developed that attach directly to the bed of a pickup truck or to a sidewall of a vehicle. A lug wrench is usually stored in a separate location in the vehicle or trailer as it is an accessory and is rather simple in construction when furnished by the original equipment manufacturer. A four-way lug wrench has greater utility and has not been used in the past to prevent theft of a spare tire when employed in conjunction with a carrier.

A search of the prior art did not disclose any patents that read directly on the claims of the instant invention, however the following U.S. patents are considered related:

| Patent No. | Inventor | Issue Date |
|---|---|---|
| 4,007,863 | Norris | Aug 5, 1975 |
| 3,865,291 | Tidwell | Feb 11, 1975 |
| 3,843,033 | Wirth | Oct 22, 1974 |
| 3,613,972 | Daughhetee | Oct. 19, 1971 |

Norris in U.S. Pat. No. 4,007,863 teaches an upright vertically extendible frame that includes depending feet that rest upon the floor of a pickup truck bed with a upper projecting abutment that engages the side wall of the pickup truck bed. A frame includes a clamp that engages the vehicle wheel and tire assembly against one side of the frame.

U.S. Pat. No. 3,865,291 issued to Tidwell is for a spare tire holder that includes an elongated spine provided with clamps for clamping its upper end to the top of a pickup truck bed side wall. Adjustable parts of the clamps are located as to not interfere with the mounting of a camper in the bed of a pickup truck. Wheel securing arrangements allow several sizes of truck wheels to be attached to the spines of the holder.

U.S. Pat. No. 3,843,033 of Wirth discloses a tire and wheel carrier mounted in a rack for a pickup truck. The carrier has a base that is mounted to the floor of the truck and includes a pair of spaced upright rods that are secured to a base element thus making it vertically adjustable relative to the base element. A top element is secured to the rods and the overhanging flange of the truck bed. A holding unit secures the wheel and tire assembly to the rods in a protected and rigid manner.

Daughhetee in U.S. Pat. No. 3,613,972 teaches a spare tire bracket that is mounted on the rear end of a pickup truck or the trunk of an automobile. A support assembly is secured to the vehicle by an anchor and the invention includes a tire connector which is mountable to a wheel of a spare tire. The tire connector includes a yoke with a threaded member connected to a lock clamp that is removable when not in use.

For background purposes and as indicative of the art to which the invention is related reference may be made to U.S. Pat. No. 3,688,954 issued to Neal on Sep. 11, 1972.

DISCLOSURE OF THE INVENTION

Spare tires are usually stored in wheelwells in the trunk of automobiles and are protected by being inside the trunk which has a deck lid lock. In recent times the popularity of pick up trucks, four wheel drive vehicles, sport utility vehicles and vans has created a different problem in that in many instances the spare tire is stored on the outside of the vehicle and as such is subject to theft if not protected by a lock. Further, many lug wrenches provided by original equipment manufacturers are rather simple and not particularly convenient to use, whereas four-way lug wrenches have been in use for decades and are fast and easy to use. It is therefore a primary object of the invention to combine the need for spare tire/wheel protection with the storage and retention of a four-way lug wrench. This object is accomplished by the use of a locking device that is attached to both the vehicle bulkhead and the spare tire/wheel carrier and uses the lug wrench as a barrier thus preventing removal of the wheel.

An important object of the invention is realized since larger vehicles have become more popular and the demand for such theft protection is obviously in the United States. Furthermore, the entire market of trailers for boats, horses, and utility hauling has been with us for as long as internal combustion vehicles have been in use and has the same problems with external mounting of spare wheel and tire assemblies. The instant invention fills this long felt need by accomplishing the task of providing a convenient yet out of the way and secure place to store the wrench and provide anti-theft protection at the same time. Four-way lug wrenches by themselves are not so expensive that they need to be specifically locked however, when one is required their usage is urgent and imperative again increasing desirability.

Another object of the invention is that its usage is almost universal as it will function with any wheel that has a center opening as small as 2 inches (5.08 cm). Since the locking mechanism must fit through a wheel hub, the actual tire size is of little importance as the wrench carrier is adjustable for tire width. This adjustability is important as tire sizes and rim diameters vary considerably.

Still another object of the invention is that almost any four-way wrench may be used with no modification required. In the United States ⅝ inch diameter wrenches have sockets to fit $^{11}/_{16}$, ¾, $^{13}/_{16}$ and ⅞ sockets, while the ¾ inch diameter wrenches fit ⅞, $^{15}/_{16}$, 1 and $1^{1}/_{16}$. Metric sizes are also commonly available in the 17 to 22 mm sizes, all of which function properly with the invention. Obviously the shaft size must be considered, but the carrier itself varies only slightly in the width of the open-ended slots that are formed into the body and locking cover that receives the wrench.

Yet another object of the invention is its adaptability to fit most vehicle spare tire carrier brackets. Since the original equipment manufacturers fabricate a bracket to fit the wheel rim, and most wheels in the industry are similar in construction, the only modification required for the use of the invention is to drill holes in the bracket to insert the attachment shaft and attach a flanged sleeve which is easily accomplished with common tools. Further if only the four-way wrench is to be stored and locked in place without the spare tire and rim, the invention is available in a configuration with a threaded shaft and locking nut permitting mounting directly to a vehicle bulkhead or trailer wall.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment mounted on a spare tire/wheel with the four-way lug wrench securing the tire in place.

FIG. 2 is a partial cross sectional view taken along the lines 2—2 of FIG. 1.

FIG. 3 is a partial isometric view of the of the four-way lug wrench carrier in the preferred embodiment shown by itself FIG. 4 is a cross-sectional view taken along the lines 4—4 of FIG. 3.

FIG. 5 is a partial isometric view of a hollow wrench carrier body completely removed from the invention for clarity.

FIG. 6 is a cross-sectional view taken along the lines 6—6 of FIG. 5.

FIG. 7 is a cross-sectional view taken along the lines 7—7 of FIG. 5 illustrating another method of construction of the hollow wrench carrier body.

FIG. 8 is a fragmentary side view of the attachment shaft means using a cotter pin for securing a flat washer.

FIG. 9 is a fragmentary side view of the attachment shaft means using a spring pin for securing the flat washer.

FIG. 10 is a fragmentary side view of the attachment shaft means using a snap ring for securing the flat washer.

FIG. 11 is a partial isometric view of another embodiment of the body with a threaded rod with an associated nut instead of the round shaft.

FIG. 12 is a partial isometric view of the flanged sleeve having securement means, completely removed from the invention for clarity.

FIG. 13 is a cross-sectional view taken along the lines 13—13 of FIG. 12.

FIG. 14 is a partial isometric view of a padlock less the shackle.

FIG. 15 is a partial isometric view of the hollow square cover completely removed from the invention for clarity.

FIG. 16 is a right end view of the hollow square cover completely removed from the invention for clarity.

FIG. 17 is a cross-sectional view taken along the lines 17—17 of FIG. 15 illustrating the padlock fastened inside the hollow of the cover.

FIG. 18 is a fragmentary isometric view of the second embodiment with the padlock swiveled in an open position and the four-way lug wrench in position in the round carrier body.

FIG. 19 is a fragmentary isometric view of the second embodiment with the padlock swiveled in a closed position less the four-way lug wrench.

FIG. 20 is an arbitrary cross sectional view of the second embodiment as depicted in FIG. 18.

BEST MODE FOR CARRYING OUT THE INVENTION

Figure 21:
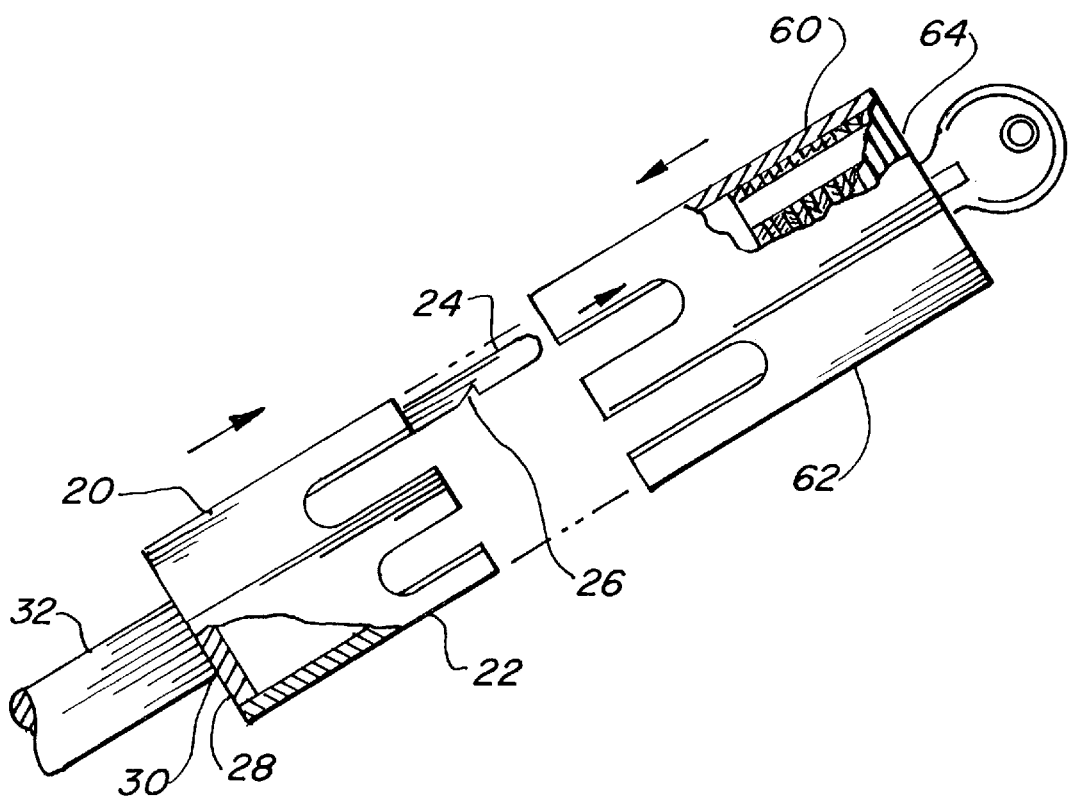
FIG. 21 is an exploded plan view of the preferred embodiment without the lug wrench, shown with the body and locking means separated to illustrate how the two pieces fit together.

The best mode for carrying out the invention is presented in terms of a preferred and second embodiment. The second embodiment differs in that the carrier body is round instead of square and the padlock uses its original shackle with the cover omitted; otherwise the balance of the invention is identical.

The preferred embodiment is shown in FIGS. 1 through 16 and is comprised of a hollow wrench carrier body 20 that includes four open-ended slots 22 in the walls of the body in pairs matching the offset radius of a conventional four-way lug wrench. The body 20, in its preferred construction, is rectangular in shape and formed of metal such as found in a steel square tube. A single separate shackle lock pin 24 is positioned within the hollow of the body at one corner and extends outward therefrom. The lock pin 24 is illustrated best in FIGS. 5–7 and 11 and is round, and includes a notch 26 that is mated with a shackle-less padlock. The lock pin 24 is permanently attached to the body 20 with pins or is preferably welded as illustrated and is beveled on the extending end for convenience when introduced into a padlock.

As shown in FIGS. 3–7 one end of the body 20 is enclosed with a bottom 28 that is either pinned as illustrated in FIG. 7 or welded in place as depicted in FIG. 6. The bottom 28 includes a hole 30 in which a round shaft 32 is connected, preferably by welding. The shaft 32 extends from the bottom and acts as a spacer having the width of a automotive wheel 34 and also has sufficient length to attach to the vehicle or trailer. In order to make a secure yet adjustable connection, as automotive wheels 34 may vary considerably in width, a flanged sleeve 36 is slideably disposed upon the shaft 32 and contains a flange 38 with holes for attachment to the wheel carrier 40 of a vehicle or trailer. FIG. 2 illustrates this connection with hex nuts and bolts holding the flange 38 tightly onto the carrier 40. It should be noted however that only three holes are necessary in most cases, and only one is illustrated because the section is taken along the centerline. Alternative connections may also be used at the interface of the flange 38 to the carrier 40 such as threaded holes, studs, threaded fasteners welded into holes, etc. all with equal utility. In order to allow for adjustment of the flanged sleeve 36 on the shaft 32 relative to the wheel width, securement means for positioning to render linear adjustment is provided, and consists of a threaded fastener 42 disposed into a threaded hole in the sleeve 36 adjacent to the shaft 32. The threaded fastener 42 may have any type of head such as a socket head, Phillips head, slotted head, Torx head or may even be a conventional set screw. In any event securement is provided and tightly locks the sleeve in place in the correct location. FIGS. 12 and 13 illustrate the flanged sleeve 36 removed from the invention for clarity and FIG. 3 shows it assembled on the shaft 32.

A shaft fastener 44 is provided on an end opposite the wrench carrier body 20 as shown in FIG. 3 and consists of a flat washer 46 held in place by a holder consisting of a cotter pin 48, illustrated in FIG. 8, or the like. The holder may also be a spring pin 50 as shown in FIG. 9 or a retaining ring 52 as depicted in FIG. 10 or any conventional pin or clip, as its purpose is to act as a secondary retainer since the sleeve with its threaded fastener 42, is the primary locking mechanism. Since this secondary protection affords only additional theft protection, the shaft fastener 44 must be easy to install initially as it is in a awkward position and yet difficult for an unauthorized person to remove. It has been found that if there is sufficient distance between the wheel carrier and the vehicle or trailer, the shaft fastener 44 may be located through a hole drilled in the existing bulkhead or wall thus rendering the fastener out of the reach of a thief. In actuality this location is usually not possible and therefore the fastener 44 is positioned just behind the carrier 40, using the inaccessibility from the outside to provide the additional protection as shown in FIG. 2.

In some instances the invention may be initially mounted directly to a wall or bulkhead when only the storage of a four-way lug wrench 54 is required. To accomplish this, the round shaft 32 may be replaced by a threaded rod 56 and a nut 58, normally of the hexagonal type as shown in FIG. 11, and with the body 20 contiguous with a wall and the threaded rod 56 penetrating a hole drilled into the vehicle or trailer fixed bulkhead with the nut 58 on the inside.

Locking means for the invention consists of a hollow rectangular locking cover 60 having open ended slots 62 that are in mirror image with the slots 22 in the body 20. A shackle-less padlock 64 is permanently encased therein as shown in FIGS. 4 and 15–17. The padlock 64 may be of any type however, a laminated steel padlock is ideal as it may be altered slightly on the outside surface to fit the inside of the hollow rectangular cover 60 without affecting the internal integrity of the lock. The normal U-shaped shackle may be removed and one of the shackle holes plugged if desired, or if the fit is correct both holes may be used if the lock is the removable shackle type.

In use the invention is attached to the wheel carrier of the vehicle or trailer when the spare tire/wheel is in place. A four-way lug wrench 54 is inserted in the open ended slots 22 of the body 20 with the four ends of the wrench resting against, or near, the tire of the spare tire/wheel. The locking cover 60 is placed over the shackle lock pin 24 and interfaces with the body thus captivating the wrench 54 between the slots 22 and reversed slots 62 as shown in FIG. 21, thus securely holding the wrench in place. For removal, a key is inserted into the lock and the locking cover 60 with its integral lock is separated from the body 20 thereby exposing the wrench 54.

It should be noted that the wrench 54 may be any type, such as a wrench calibrated in inches or in metric sizes, however, it has been found that a ⅝ and ¾ inch diameter wrench has proven to be ideal for the application.

The second embodiment of the invention is shown in FIGS. 18–20 and is basically the same as the preferred embodiment except a hollow round metallic body 66 is used with a conventional padlock 68 that includes a U-shaped shackle 70 of the standard type. The shackle 70 is permanently affixed within the hollow round wrench carrier body 66 and is aligned between slots 22 that are the same as the preferred embodiment. The locking cover 60 is not required as the case of the padlock 68 is utilized instead. In use, access is gained by unlocking the padlock 68 with a key and then simply rotating the case out of the way thus freeing the four-way lug wrench 54. When locked, the padlock case is held tightly against the round body 66 thereby captivating the wrench in the slots 22 and achieving the desired securement.

While the invention has been described in complete detail and pictorially shown in the accompanying drawings, it is not to be limited to such details, since many changes and modifications may be made in the invention without departing from the spirit and scope thereof hence, it is described to cover any and all modifications and forms which may come within the language and scope of the appended claims.

What is claimed is:

1. A locking four-way lug wrench carrier which is movably attached to a motor vehicle or trailer for mountably securing a four-way lug wrench, and also to safeguard a spare tire and wheel assembly from unauthorized removal, utilizing the lug wrench as a protective restraint comprising:

a) a hollow wrench carrier body having a plurality of open ended slots therein, b) a shackle connected to and extending from the hollow within the wrench carrier body, c) attachment shaft means permanently joined to the hollow wrench carrier body for connection to a motor vehicle or trailer, and d) locking means slideably fastened to the extending shackle for attachment, and when locked, for the prevention of unauthorized removal, e) a four-way lug wrench disposed within the open ended slots of the hollow wrench carrier body and secured in place by the locking means, for attachment of the wrench to a motor vehicle and trailer and also for retaining a spare tire and wheel to said vehicle or trailer when the carrier body attachment shaft means is connected to a vehicle or trailer spare tire carrier and bulkhead.

2. The locking four-way lug wrench carrier as recited in claim 1 wherein said hollow wrench carrier body is rectangular in shape and formed of metal.

3. The locking four-way lug wrench carrier as recited in claim 2 wherein said shackle is a single separate lock pin positioned within a corner of the hollow rectangular wrench carrier body.

4. The locking four-way lug wrench carrier as recited in claim 1 wherein said attachment shaft means further comprises a round shaft having a flanged sleeve slideably disposed thereupon, said sleeve further having securement means for positioning the sleeve on the shaft, thus providing linear adjustment relative to a tire width and depth when the flange is fastened to a vehicle or trailer tire carrier.

5. The locking four-way lug wrench carrier as recited in claim 4 wherein said attachment shaft means further comprises a shaft fastener on the round shaft on an end opposite the wrench carrier body for securing the shaft to a bulkhead of a vehicle or trailer in the event that the flanged sleeve is removed by an unauthorized person.

6. The locking four-way lug wrench carrier as recited in claim 1 wherein said attachment shaft means further comprises a threaded rod and an associated nut for attachment directly through a fixed bulkhead of a vehicle or trailer.

7. The locking four-way lug wrench carrier as recited in claim 1 wherein said locking means further comprises a hollow rectangular locking cover with a shackle-less padlock permanently encased therein, with said locking cover slideably disposed over said hollow rectangular wrench carrier body and said lock pin penetrating said padlock achieving protection and only permitting removal by the utilization of a key.

8. The locking four-way lug wrench carrier as recited in claim 1 wherein said hollow wrench carrier body is round in shape and formed of metal.

9. The locking four-way lug wrench carrier as recited in claim 8 wherein said shackle is integral with a padlock.

10. The locking four-way lug wrench carrier as recited in claim 9 wherein said locking means is a padlock having a U-shaped shackle with the shackle permanently affixed within the hollow round wrench carrier body and aligned between said slots, thus further affording removal of the four way lug wrench only by utilizing a key for unlocking and rotating the lock case away from the hollow inside the round carrier body.

11. The locking four-way lug wrench carrier as recited in claim 1 wherein said four way lug wrench is the ⅝ inch diameter type.

12. The locking four-way lug wrench carrier as recited in claim 1 wherein said four way lug wrench is the ¾ inch diameter type.

13. A locking four-way lug wrench carrier removably attached to a motor vehicle or trailer for mountably securing a four way lug wrench to safeguard a spare tire and wheel assembly from unauthorized removal, utilizing the lug wrench as a protective restraint comprising:
  a) a rectangular hollow wrench carrier body having a plurality of open ended slots therein,
  b) a separate lock pin shackle connected inside the corner of and extending from the hollow within the wrench carrier body,
  c) locking means slideably fastened to the extending shackle for attachment, and when locked for the prevention of unauthorized removal,
  d) attachment shaft means in the form of a round shaft permanently joined to the hollow wrench carrier body, and a flanged sleeve for connection to a motor vehicle and trailer spare tire carrier and
  e) a four-way lug wrench disposed within the open ended slots of the hollow wrench carrier body and secured in place by the locking means, for attachment of the wrench to a motor vehicle and trailer and also for retaining a spare tire/wheel to said vehicle or trailer when the carrier body attachment shaft means is connected to a vehicle or trailer bulkhead and spare tire carrier.

14. A locking four-way lug wrench carrier removably attached to a motor vehicle or trailer for mountably securing a four-way lug wrench, and also to safeguard a spare tire and wheel assembly from unauthorized removal utilizing the lug wrench as a protective restraint comprising:
  a) a body having a plurality of open ended slots therein,
  b) a shackle connected to and extending from said body,
  c) locking means slideably attached to the shackle for the prevention of unauthorized removal,
  d) attachment shaft means permanently joined to the body for connection to motor vehicles and trailers, and
  e) a four-way lug wrench disposed within the slots of the body and secured in place by the locking means, for attachment of the wrench to motor vehicles and trailers and also for retaining a spare tire/wheel to said vehicle or trailer when the carrier body attachment shaft means is connected to a vehicle or trailer bulkhead and spare tire carrier.

* * * * *